United States Patent [19]

Love

[11] Patent Number: 4,642,888
[45] Date of Patent: Feb. 17, 1987

[54] WIRE MOUNTING FOR CONTROL PANELS

[76] Inventor: James H. Love, 3909 Woodland Ave., Western Springs, Ill. 60558

[21] Appl. No.: 669,218

[22] Filed: Nov. 7, 1984

[51] Int. Cl.⁴ .......................... H05K 3/30; H02B 1/02
[52] U.S. Cl. ...................................... 29/832; 361/346; 361/348; 361/417; 361/419; 24/518; 24/569; 24/658; 248/298
[58] Field of Search ................... 29/832, 834; 361/346, 361/348, 417, 419, 428; 24/518, 569, 658; 248/298; 403/405

[56] References Cited

U.S. PATENT DOCUMENTS

| | | | |
|---|---|---|---|
| 2,709,060 | 5/1955 | Williams | 248/298 |
| 4,144,555 | 3/1979 | McGalliard | 361/346 X |
| 4,227,239 | 10/1980 | Boyer et al. | 361/428 X |

FOREIGN PATENT DOCUMENTS 457497  11/1936  United Kingdom ................ 248/298

Primary Examiner—Howard N. Goldberg
Assistant Examiner—Carl J. Arbes
Attorney, Agent, or Firm—Keil & Weinkauf

[57] ABSTRACT

Method and apparatus for organizing and securing in place wires and/or conduits on the rear face of a control display panel in proximity to a plurality of controls, actuators, signals, devices and the like.

13 Claims, 9 Drawing Figures

WIRE MOUNTING FOR CONTROL PANELS

This invention relates to improvements in the wiring of control panels, and more particularly relates to an improved method and article of manufacture for securing electrical wiring along the inner surface of a control display panel or door adjacent to the various controls, actuators, signals and devices that are mounted on the control display panel.

Many apparatus and process systems are monitored and controlled from stations where various controls, actuators, signals and devices are located. Frequently one or more and often a great number of such controls, actuators, signals and devices are neatly organized on a display panel or door with all of the associated electrical wiring hidden from view along the rear side or face of the control display panel. The control display panel is often a stationary panel which is serviced from the rear, although the control display panel may often be a hinged or removable panel or door that may be serviced from the front. Often there are a very great number of individual wires and/or conduits connected to the various controls, actuators, signals and devices and it is necessary to confine the wires and/or conduits to certain pathways so as to maintain them clear of the operative connective ends of the controls, actuators, signals and devices. The apparatus required for such pathways is similar to that which is normally provided for electrical circuitry that may be located out-of-sight within the control panel cabinet, or in another structure remote from the actuators and signals, and a variety of suitable encasements and/or harnesses is available. However, such known encasements and harnesses are normally fastened directly to the surface on which the various components are mounted by rivet, screw or other fastener.

In the case of the control display panel or door, however, for reasons of aesthetic appearance and to prevent defacement of the control display panel or door, for sealing purposes and to provide for the unencumbered arrangement of the controls, actuators, signals and devices, mechanical fasteners that penetrate or are welded to the control display panel or door to position such encasements, harnesses and/or terminal devices are undesirable. Also adhesive means are regarded as unreliable, possibly due to the fact that the wiring behind the panel pulls downward by gravity and the control display panel or door is subjected to various mechanical stresses, thermodynamic shocks and chemical influences which tend to precipitate the failure of an adhesive bond. Thus such encasements and harnesses are not commonly used on control display panels with the result that the wiring has tended to be difficult and time consuming to install or trace, messy, and the weight thereof is generally supported directly from the wiring connections on the various controls, actuators, signals and devices.

While the invention is described principally with reference to electrical wiring application, it is also applicable to other systems that are similarly installed and utilize pneumatic or hydraulic medium in small diameter conduits or tubes to transmit control signals.

OBJECTS AND SUMMARY OF THE INVENTION

Accordingly, it is a principal object of the present invention to provide an improved method for securing wiring or conduits to the inner or rear side of a control display panel or door.

It is a further object of the present invention to provide an improved method for securing wiring or conduits to the inner side of a control display panel or door utilizing encasements which are mechanically fastened to the panel or door without penetrating or otherwise defacing or effecting the outer surface thereof.

It is still another object of the present invention to provide an improved article of manufacture for securing encasements or other apparatus to the inner side of a control display panel or door.

It is yet another object of the present invention to provide an improved mounting bracket for supporting wiring encasements from the inner side of a control display panel, which bracket is mountable with the controls, actuators, signals and devices that are secured on the display panel.

It is a still further object of the present invention to provide an improved mounting bracket and fastener for securing and supporting wiring encasements from the inner side of a control display panel which bracket is mountable with the controls, actuators, signals and devices that are secured on the display panel.

BRIEF DESCRIPTION OF THE DRAWINGS

Further objects and advantages of the present invention will become apparent upon reading the following specification in conjunction with the drawings wherein.

DETAILED DESCRIPTION OF THE PREFERRED EMBODIMENT

Generally speaking the present invention provides for the laying of multiple wires or conduits along a defined path within an encasement member which encasement is, in turn, fastened to one or more brackets which are secured between the inner surface of a control display panel and the control, actuator, signal or other devices that are secured in that panel.

Figures 1, 2:
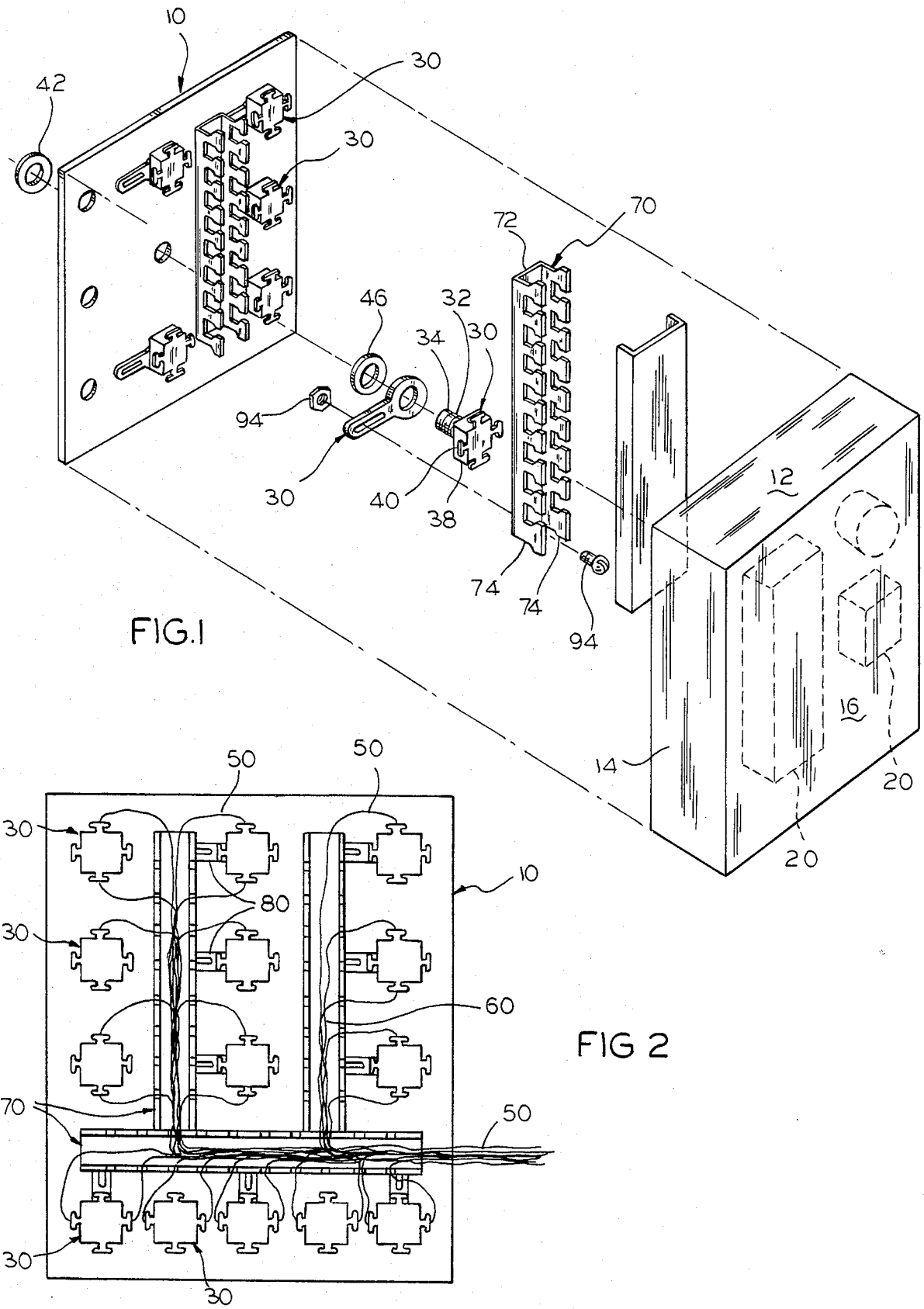
FIG. 1 is an exploded view of an enclosure embodying the present invention.
FIG. 2 is a plan view of the inner side of a control display panel embodying the present invention.
Figure 3:
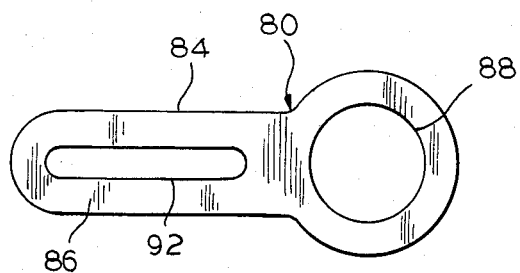
FIG. 3 is a detailed plan view of one embodiment of a mounting bracket.

As may be seen in FIG. 1, a control display panel or door generally 10, is permanently or removably mounted on an enclosure body generally 12, such as a cabinet, which has a plurality of side walls 14 and a rear wall 16 which may also be permanently or removably affixed thereto. A number of components, shown figuratively by the reference character 20, may be located within the enclosure body 12, usually secured to the rear wall 16 or to one or more interior mounting panels (not shown). Components may comprise fuses, bar connectors, relays, timers, step motors, terminal devices solenoid switches, condensers, capacitors, vacuum tubes, solid state devices, mechanical devices, and functionally similar hydraulic and pneumatic elements and the like. Most often these are interconnected by various means and/or connected to the controls, actuators, signals and devices, generally 30, which are mounted in and/or on the control display panel or door, generally 10.

The controls, actuators, signals and devices, generally 30, comprise a wide variety of items such as push button and selector switches, twist dial timers, lights, indicators, meters, etc. They may also take a variety of structural forms; but, generally speaking, many elements designed for use on display panels or doors have a cylindrical threaded body 32 extending between an operator end 34, such as a pushbutton or visible indicator, etc., which is contained within the cylindrical body 32, and a connector end 38 which is usually of larger dimension and is formed on the threaded body 32 by a shoulder or shank 40. Such items are mounted on the control display panel or door 10 by passing the threaded body 32 through a hole of slightly greater diameter and securing it therein by a lock nut 42 being turned upon the operator end 34 of the threaded body 32. Spacers or washers 46 may be utilized to space the device 38 from the inner face of the control panel or door 10 and the use of such spacers or washers is preferred with the present invention. Also washers and/or legend tags (not shown) may be used to seal or space the operator end and outer face of the panel 10.

A plurality of wires 50 or conduits are secured to the devices 38 of the various controls, actuators and signals 30 and normally interconnect such elements and extend to various of the components 20 and possibly other actuators and signals 30. It will be apparent that as the number of controls, actuators, signals and devices 30 are increased, the numbers of wires 50 or conduits may greatly increase and it thus becomes clear that there is a need to organize the wires 50 or conduits along pathways generally 60, to prevent electrical short circuits and to facilitate both construction and servicing of the control panel and its elements.

It has been found that this may be greatly facilitated by securely positioning encasement members, generally 70, which will define the pathways 60, preferably prior to the time at which the wires or conduits are implaced and connected to the actuators and signals 30. Such encasements may take a number of structural forms and generally are adapted to hold the wires 50 or conduits in place. A number of suitable encasements are available commercially in lengths that may be subdivided by the user. Such encasements 70 typically have bottom and side members, 72,74, to form a chute within which the wires 50 or conduits may be laid. The side members 74 may be deformable so as to be shaped so as to encircle the wires 50 or conduits. Or the encasements 70 may be closed with removable tops which snap fit onto the side members 72,74.

An essential feature of the present invention enables the encasements 70 to be rigidly mounted on the back side of the display panel 10 without penetrating the panel with mechanical fasteners or otherwise being directly mounted to the panel 10. This is accomplished by utilizing a plurality of novel mounting means, generally 80, in the form of a bracket having an arm portion 84 extending between a fastener receiving portion 86 and an enlarged opening 88. The opening 88 may be in the form of an eye within an annular collar, adapted to be secured between the rear side of the display panel 10 and a device 38 of an actuator or signal, generally 30. The enlarged opening 88 may be of a variety of shapes and preferably is an annular collar of a dimension to closely match the cylindrical threaded body 32 of an actuator or signal and is fitted onto that body adjacent the shoulder 40 prior to inserting the body 32 in its opening in the control panel or door 10 and may be adjusted between various positions about the body 32. Also it is preferred to utilize one or more spacers or washers 46 between the annular collar 88 and the display panel so as to space the entire mounting means, generally 80, from the backside of the display panel 10. This will assist in insulating the wires 50 or conduits from the control cabinet and also facilitate securing the encasements 70 to the fastener receiving portions 86 of the mounting brackets 80 and further seal the openings in the panel 10.

In one embodiment of the mounting means, generally 80, the fastener receiving portion 86 comprises an elongated slot 92 which may be sized to receive a fastener, generally 94, and allows for a degree of adjustment in the alignment of the encasement, generally 70, and the position of a fastener 94 through it. Fasteners may take a number of forms such as nuts and bolts, screws, rivets, etc.; and the fastener receiving portion 86 of the mounting means 80 may also take a variety of forms such as the illustrated slot 92 or one or a plurality of holes (not illustrated) or the fastener receiving portion 86 may be comprised of a soft metal or plastic, for example, adapted to receive a fastener such as a screw (not illustrated). Similarly the mounting means, generally 80, may be formed from a number of materials such as, but not limited to, metal or plastic.

Figure 4:
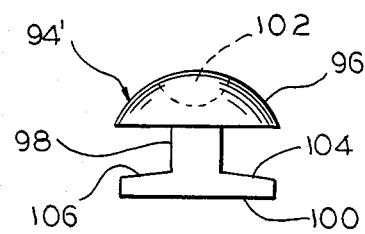
FIG. 4 is an enlarged side elevation view of a preferred fastener for use with a mounting bracket.

A preferred fastener, generally 94', is shown in FIG. 4 and comprises a low rounded head 96 with a short rectangular shank 98 terminating in a narrow transversely extending key portion 100. The key 100 extends at least to one side of the shank and preferably extends from two opposite sides thereof. The rounded head is highly advantageous to avoid scuffing and damage to wiring or conduits placed in the encasement generally 70; and the head 96 should contain a drive slot 102, desirably in the form of a Phillips head to minimize scuffing that may be caused by the slot 102. The shank 96 is of a square cross section to fit through apertures found in encasements 70 and also through the slot 92 in bracket 80; and the length of the shank is approximately equal to the combined thickness of the encasement bottom and the bracket 80. The key portion 100 is similarly dimensioned to fit through the apertures and slot 92 but to engage the backside of the bracket 80 receiving portion 86 when twisted a quarter turn (90°). Preferably the key 100 has upper surfaces 104,106 that are slightly tapered away from the head so as to facilitate engagement with the bracket 80 backside when turned.

It will be seen that it is possible to support two and even more mounting means, generally 80, from a given electrical actuator or signal 30, if necessary, and thereby there is a great latitude in which the wire pathways 60 and encasements 70 may be laid out. Each section of encasement 70 is preferably fastened to two or more mounting means 80 so as to be held rigidly in place. Often it will be advantageous to leave the actuators and signals 30 loosely mounted in the display panel or door 10, as by not fully tightening the lock nuts 42 until the encasements 70 have been secured to the receiving portions 86 of the brackets, and only then completely tightening the lock nuts 42. Thereafter the plurality of wires 50 or conduits are individually connected to the various controls, actuators, signals and devices 30, and laid into the appropriate encasement 70. When all the wires 50 or conduits have been thus assembled and connected to the respective components 20, the display panel, if previously removed, may be remounted on the cabinet body 12.

Figure 5:
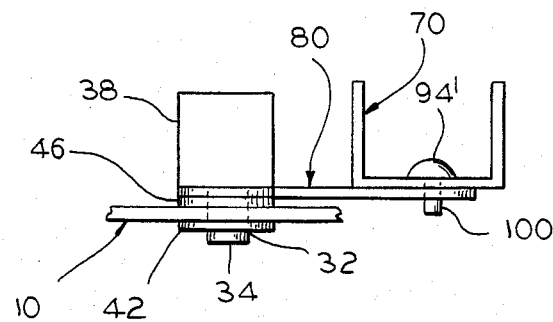
FIG. 5 is a partial elevation view of the present invention showing a bracket of FIG. 3 with a wire encasement fastened thereto attached to a device which is affixed to a control display panel.
Figure 7:
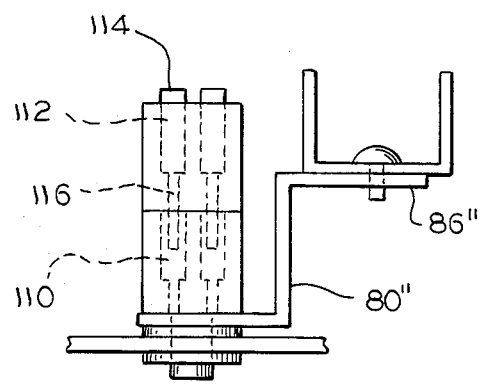
FIG. 7 is a partial elevation view similar to FIG. 5 with still another form of bracket.
Figure 6:
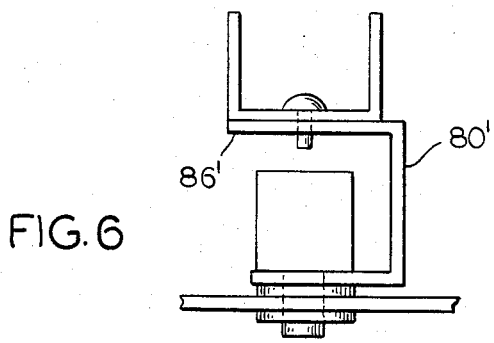
FIG. 6 is a partial elevation view similar to FIG. 5 with another form of bracket.

In FIG. 5 the first embodiment of bracket, generally 80, is shown connected between a connector end 38 (of a control, actuator, or the like) and spacer 46 and panel wall generally 10, with an encasement, generally 70, secured to the bracket 80 by a preferred fastener 96 (seen from an end with the key 100 turned toward the viewer) to one side of the connector end 38. Modified shape brackets are shown in FIGS. 6 and 7, and identified by the same reference characters bearing prime (') and double prime (") superscripts respectively, which position the mounting and fastener receiving portions in different planes. These modified shapes are useful where the connector ends 38 are relatively crowded on the display panel or door with little space between them. In FIG. 6 the bracket 80' is bent in a "U" shape with the fastener receiving portion 86' bent opposite the enlarged opening 88' so as to be above the connector end 38. In FIG. 7 the bracket 80" is bent in "S" or "Z" shape to hold the fastener receiving portion 86" above and away from the connector end 38. The latter form may be particularly advantageous if plural connector ends 38 are ganged atop one another (which some commercially available switches are designed for by utilizing connector bolts 110 which comprise female threaded barrels 112 and heads 114 and threaded male members 116 of smaller dimension to mate with the female threads in the barrel 112 of a similar bolt 110).

Figure 9:
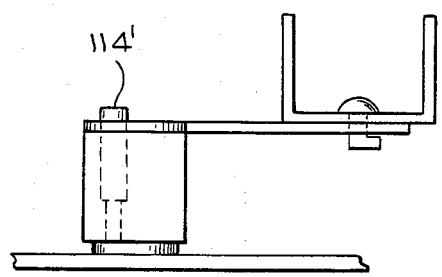
FIG. 9 is a partial elevation view similar to FIG. 5 showing the mounting bracket of FIG. 8.
Figure 8:
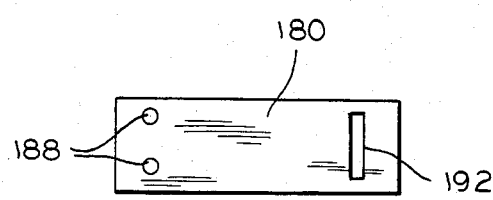
FIG. 8 is a detailed plan view of still another embodiment of a mounting bracket.

Another embodiment of a mounting bracket 180 shown in FIGS. 8 and 9 is designed to be secured to the rear face of connector end 38, or the like by the aforementioned bolts 110. In this embodiment one or more bolt openings 188 are provided at one end, and a fastener receiving slot 192 is located in the opposite end. As shown in FIG. 8 the slot 192 may be transverse to the length of the bracket.

It will be apparent to those skilled in the art that various modifications and changes may be made without departing from the scope of the invention which is defined in the following claims.

What is claimed is:

1. An improved method for securing wiring and conduits to the inner side of a control display panel without penetrating the panel, said method comprising:

inserting all necessary controls, actuators, signals and devices through openings cut in said panel;

securing mounting means in the form of brackets to at least some of said controls, actuators, signals and devices said brackets being secured between the connector ends of said controls, actuators, signals and devices and the inner face of said panel and being spaced from the inner face of said panel;

fastening encasement means to one or more of said brackets, said encasement means being positioned to hold a plurality of wires and conduits in at least one pathway disposed adjacent to a plurality of said controls, actuators, signals and devices; and connecting a plurality of wires and conduits to said controls, actuators, signals and devices arranging said wires and conduits to run within one or more of said encasement means.

2. The method of claim 1, wherein the mounting brackets are spaced by inserting annular spacers about the controls, actuators, signals and devices between the said inner face and the said mounting means.

3. The method of claim 1, wherein the controls, actuators, signals and devices have threaded cylindrical bodies which extend through holes in said panel and which are mounted thereon by tightening nuts on said threaded bodies against the outer surface of said panel and wherein the nuts are left loose until after the said encasement means is fastened to said mounting means whereby to allow for alignment of said encasement means and said mounting means.

4. The method of claim 1, wherein the mounting brackets are positioned parallel to one another and the encasement means is then secured to the said brackets.

5. The method of claim 4, wherein the said encasement means is secured to said brackets by fasteners having a smooth head and a shaft with a key extending to a side of said shaft whereby to extend through openings in said encasements and brackets with said key turned to engage the underside of said bracket.

6. An article of manufacture for use in securing wiring and conduits to the inside of a control panel having controls, actuators, signals and devices mounted therethrough, said article comprising:

a mounting bracket having a first opening whereby said mounting bracket may be secured to one of said controls, actuators, signals and devices, and a fastener receiving portion of said mounting bracket spaced from said first opening, said first opening being adapted to conform to the shape of the portion of said controls, actuators, signals and devices extending from a rear face of said panel and the bracket is secured between the panel and one of said controls, actuators, signals and devices.

7. The article of manufacture of claim 6, wherein said fastener receiving portion is at an end of an arm extending from said first opening.

8. The article of manufacture of claim 7, wherein said arm is bent so as to position said first opening and said fastener receiving portion in different planes.

9. The article of manufacture of claim 6, wherein the mounting bracket may be adjustable among various positions about a control, actuator, signal or device to which it is secured.

10. The article of manufacture of claim 6, wherein the said first opening is an eye formed within an annular collar that will encompass the body of a control, actuator, signal or device.

11. The article of manufacture of claim 10, wherein the said fastener receiving portion is a second opening in said mounting bracket smaller than said first opening.

12. The article of manufacture of claim 10, wherein the fastener receiving portion is a slot in said bracket.

13. The article of manufacture of claim 10, wherein the fastener receiving portion is a slot extending radially and spaced from said eye.

* * * * *